United States Patent Office 3,160,514
Patented Dec. 8, 1964

3,160,514
PRINTING ON POLYMER SURFACES
Charles E. Wheelock, Minneapolis, Minn., assignor to Phillips Petroleum Company, a corporation of Delaware
No Drawing. Filed Jan. 8, 1962, Ser. No. 165,039
18 Claims. (Cl. 117—38)

This invention relates to a novel polymer composition having a surface strongly receptive to inks and coating compositions. In one aspect, it relates to a method for improving the bonding properties of polymers of aliphatic 1-olefins. In another aspect, it relates to a method for printing on the surfaces of polymers of aliphatic 1-olefins.

This application is a continuation-in-part of my copending application having Serial No. 686,842, filed September 30, 1957, now abandoned.

Various methods are described in the literature for producing normally solid and semisolid polymers. For example, hydrocarbons such as ethylene, propylene, isobutene, butadiene and styrene, can be polymerized, either independently or in various admixtures with one another, to produce solid or semisolid polymers. Recently, considerable attention has been directed to the production of solid polymers of ethylene and/or propylene. The polymerizations are frequently carried out in the presence of solid catalyst, utilizing a liquid solvent as the reaction medium. These novel solid polymers have many applications and are especially useful in the fabrication of molded and extruded articles, such as food containers, bottles, film, rods, pipe, and the like. Many of the articles produced require that various printed matter, such as identifying names, trademarks, trade names, instructions, and the like, be printed, stamped, or otherwise applied to the polymer surface. Several methods have been proposed for accomplishing such printing, e.g., by the use of a special ink or by special treatment of the polymer surfaces to increase their affinity for an ink. However, such methods have not proven to be entirely satisfactory, generally, either because of an adverse effect on the polymer properties or poor ink adhesion. In accordance with this invention, there is provided a polymer composition having a surface which is very receptive to inks and coating compositions.

It is an object of this invention to provide a novel polymer composition having a surface which has a strong affinity for inks and coating compositions.

Another object of the invention is to provide a method of printing on the surface of a 1-olefin polymer, which does not have any adverse effect on the polymer properties.

Other and further objects and advantages of the invention will become apparent to those skilled in the art upon consideration of the accompanying disclosure.

The instant invention resides in a novel composition of matter comprising a polymer of an aliphatic hydrocarbon, particularly a polymer of an aliphatic 1-olefin, and sulfur-containing compound selected from the groups consisting of sulfonic acids, sulfonyl chlorides and sulfonamides. It has been discovered that such a polymer composition provides a surface which is very responsive to printing inks. The reason the polymer composition has a surface to which printing inks are so strongly adherent is not completely understood. However, it is believed that addition of the sulfur-containing compound to the solid polymer results in a polymer composition having a surface to which materials in the ink are chemically bonded.

The invention is applicable to solid polymers selected from homopolymers of aliphatic 1-olefins having up to and including 8 carbon atoms per molecule, such as ethylene, propylene, butene-1, pentene-1, 4-methylpentene-1, hexene-1, heptene-1, octene-1, and the like, and copolymers of two or more of said 1-olefins, such as copolymers of ethylene and propylene, ethylene and butene-1, propylene-butene-1, ethylene and hexene-1, propylene and octene-1, ethylene and 4-methylpentene-1, ethylene and octene-1, hexene-1 and octene-1, and the like. The term "polymer of ethylene," for example, as used herein, is intended to include polymers obtained by polymerizing ethylene alone and by polymerizing mixtures of ethylene and minor amounts of other monoolefins containing from 3 to 8 carbon atoms per molecule. Particular polymers which can be improved with respect to ink printing properties according to the invention include polyethylene, polypropylene, ethylene-propylene copolymers, ethylene-butene-1 copolymers, propylene-butene-1 copolymers, ethylene-hexene-1 copolymers, and the like. Conventional polyethylenes, such as low density polyethylenes produced by high pressure processes, can be used in preparing the novel composition of this invention. High density solid homopolymers and copolymers of 1-olefins produced in accordance with the process described in the copending U.S. patent application of Hogan and Banks, now U.S. Patent 2,825,721, issued March 4, 1958, can also be advantageously utilized, and are generally preferred because of their outstanding properties. These latter polymers often have an inherent viscosity of at least 0.8, preferably an inherent viscosity between 1.2 and about 10, as determined for a solution of 0.2 gram of polymer in 50 cc. of tetralin at 130° C. Certain of these polymers also have a density of at least 0.94, preferably at least 0.95, at 25° C. and a crystallinity of at least 70 percent, preferably at least 80 percent, and more desirably at least 90 percent, at 25° C. The crystallinity of the polymers can be determined by measurements of nuclear magnetic resonance [Wilson and Pake, Journal of Polymer Science, 10, 503 (1953)], using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by a fall of about 1.5° C. per minute at 135° C. The crystallinity can also be determined according to the method of Matthews, Peiser and Richards, Acta Crystallographica 2, 85 (1949). The softening point of the polymer will vary with the particular polymer used increasing as the density and the crystallinity of the polymer increases. Generally, the softening point of the high density solid polymer is above about 250° F., preferably in the approximate range of 250 to 300° F., and is several degrees higher, e.g., about 10° F., than the melting point of the polymer.

The sulfur-containing compounds used in preparing the novel compositions of this invention can be represented by the following formula:

$$Y(SO_2X)_n$$

wherein Y is at least one radical selected from the group consisting of mono-, di-, and trivalent hydrocarbon radicals, said radicals containing from 4 to 30, inclusive, carbon atoms, wherein X is a member selected from the group consisting of OH, Cl, and $NZ_2$, where Z is a member selected from the group consisting of hydrogen and alkyl, aryl, alkaryl, aralkyl and cycloalkyl radicals, containing from 1 to 7, inclusive, carbon atoms, and wherein $n$ is equal to the valence of Y, i.e., 1, 2 or 3.

The Y in the above formula can also be defined as at least one hydrocarbon radical selected from the group consisting of mono-, di- and trivalent aromatic radicals, mono-, di- and trivalent saturated acyclic radicals, mono-, di- and trivalent monoolefinic acylcic radicals, mono-, di- and trivalent saturated alicyclic radicals, and mono-, diand trivalent monoolefinic alicyclic radicals, said radicals containing from 4 to 30, inclusive, carbon atoms. There are listed hereinafter examples of the parent compound from which the corresponding radical can be derived. It is to be understood that the compounds listed are merely illustrative and that on reading this disclosure other suitable compounds will become apparent to those skilled in the art. Examples of compounds from which aromatic radicals can be derived include benzene, naphthalene, and diphenyl. The saturated and monoolefinic acyclic radicals can be derived from such compounds as butanes, pentanes, hexanes, decanes, tetradecanes, heptadecanes, eicosanes, triacontanes, butenes, pentenes, heptenes, dodecenes, hexadecenes, heneicosenes, pentacosenes, and tricontenes. The saturated and monoolefinic alicyclic radicals can be derived from such compounds as cyclopentane, cyclohexane, cyclopentene, and cyclohexene. Examples of compounds from which combinations of the aforementioned radicals can be drived include butylbenzene, hexylbenzene, dodecylbenzene, eicosylbenzene, tetracosylbenzene, ethylcyclopentane, heptylcyclopentane, octadecylcyclopentane, pentacosylcyclopentane, tridecylcyclohexane, nonadecylcyclohexane, tetracosylcyclohexane, butylcyclopentene, octycyclopentene, pentadecylcyclohexene, docosylcyclohexene, tricosylcyclohexene, and tetracosylcyclohexene.

In the practice of the instance invention, it is preferred to utilize sulfur-containing compounds which have an aromatic radical and which can be represented by the following structural formulas:

(1)

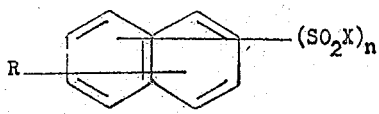

(2)

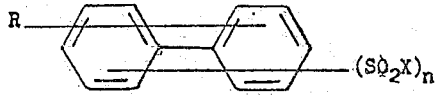

and (3)

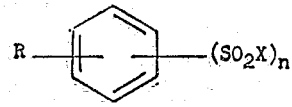

wherein R is a member selected from the group consisting of hydrogen and alkyl, wherein X is a member selected from the group consisting of OH, Cl, and $NZ_2$, where Z is selected from the group consisting of alkyl, aryl, alkaryl, and aralkyl, each of the latter radicals containing from 1 to 7, inclusive, carbon atoms, and wherein $n$ is an integer from 1 to 3, inclusive. The total number of carbon atoms in the rings inclusive of the substituted alkyl groups falls in the range of 6 to 30, inclusive, carbon atoms. It is to be understood that the R groups can be alike or different. Furthermore, when there is more than one ring in the compound, the R groups can then be either all on one ring, or a part on one ring and another part on the other ring. It is also understood that when there is more than one ring in the compound and there are two or three $SO_2X$ groups, the groups can be on the same or on different rings.

Examples of, but not exhaustive of, sulfonic acids which can be used in the practice of this invention are 1-butanesulfonic acid, 2-methyl-1-propanesulfonic acid, 2-methyl-3-propanesulfonic acid, 1-pentanesulfonic acid, 2-pentanesulfonic acid, 1-dodecanesulfonic acid, 1-hexadecanesulfonic acid, 3-ethyl-1-hexanesulfonic acid, 1,1-butanedisulfonic acid, 4-methyl-1-heptanesulfonic acid, 4-methyl-1,6-heptanedisulfonic acid, 1,6-octanedisulfonic acid, 1,5,8-octanetrisulfonic acid, 1-tricontanesulfonic acid, 2-butene-1-sulfonic acid, 2-hexene-1-sulfonic acid, 2-hexene-1,6-disulfonic acid, 1,5,10-decenetrisulfonic acid, benzenesulfonic acid, p-benzenedisulfonic acid, p-toluenesulfonic acid, o-toluenesulfonic acid, p-ethylbenzenesulfonic acid, 1-cyclohexenesulfonic acid, 2,4,5-cyclohexene trisulfonic acid, 4-ethyl-1-cyclopentenesulfonic acid, 2-ethylbenzenesulfonic acid, 2-propyl-4-octylbenzenesulfonic acid, 2,4-dioctylbenzenesulfonic acid, 2,4,5-trioctylbenzenesulfonic acid, 1-naphthalenesulfonic acid, 2-naphthalenesulfonic acid, 1,5-naphthalenedisulfonic acid, 1,3,5-naphthalenetrisulfonic acid, 2-ethyl-4,7-dipropylnaphthalenesulfonic acid, 2,7-dioctylnaphthalenesulfonic acid, naphthalene-1,6-disulfonic acid, naphthalene-2,7-disulfonic acid, naphthalene-1,5,7-trisulfonic acid, naphthalene-1,3,6-trisulfonic acid, naphthalene-1,3,7-trisulfonic acid, diphenyl-3,3'-disulfonic acid, 5,5'-dibutyl-3,3'-diphenyldisulfonic acid, 6,6'-dioctyl-2,2'-diphenyldisulfonic acid, and the like. It is to be understood that the sulfonyl chlorides and sulfonamides corresponding to the above-listed sulfonic acids can also be used in the practice of the instant invention. Furthermore, as previously indicated, the alkyl, aryl, alkaryl, aralkyl and cycloalkyl derivatives of the sulfonamides can be employed. Examples of these latter compounds are N-methylbutanesulfonamide, N,N-dimethylbutanesulfonamide, N,N-diheptylbutanesulfonamide, N-methyl-N - propylbutanesulfonamide, N - methyl-1,1-octanedisulfonamide, N,N' - diethyloctane - 1,1-disulfonamide, N,N,N',N' - tetraethyloctane - 1,1 - disulfonamide, N,N-diheptyl-1-hexadecanesulfonamide, N - phenylbenzenesulfonamide, N,N-diphenylbenzenesulfonamide, N-phenyloctanesulfonamide, N - phenyl-2-naphthalenesulfonamide, N,N - dicyclohexyl-1-hexadecanesulfonamide, and the like.

The sulfur-containing compounds used in preparing the novel compositions of this invention can be produced by methods which are described in the prior art. For example, the sulfonation reaction can be carried out by the use of concentrated sulfuric acid or fuming sulfuric acid. Sulfonyl chlorides can be readily formed through the reaction of sulfonic acids or their salts with phosphorus pentachloride. The amides of sulfonic acid can be prepared by the reaction of sulfonyl chlorides with ammonia or amines.

The amount of sulfur-containing compound necessary to be added to the solid polymer in order to provide a polymer composition having a surface strongly adherent to printing ink is usually very small. The sulfur-containing compounds are generally admixed with the polymer in amounts ranging from 0.01 to 3, preferably from 0.05 to 1, weight percent, based on the amount of the polymer. The optimum concentration to use in order to provide a polymer composition having a surface to which a particular ink is strongly adherent can be readily determined by routine tests.

In preparing the compositions of this invention, the sulfur-containing compounds are generally incorporated into the solid polymer at a temperature sufficiently high to soften the polymer and thereby facilitate blending. This is usually accomplished at a temperature above the softening point of the polymer but not above the temperature at which degradation of either of the components takes place. Blending of the sulfur-containing compound with the solid polymer can be accomplished by any suitable means, such as on a roll mill, in a Banbury mixer, by heating and mixing in a vessel provided with a suitable means for agitation, or the like, the blending or mixing of the material being continued until a homogeneous composition is obtained. It is also within the purview of the invention to add the sulfur-containing compounds to the solid polymer during the molding or extrusion operations performed in fabricating various articles.

While the present invention is not limited to any specific ink, it is usually preferred to use a printing ink which employs a vehicle containing a drying oil. Examples of drying oils, usually of vegetable origin, which can be used, include linseed oil (lithographic "litho" varnishes), tung oil, soybean oil, and the like. Of the various drying oils, it is generally preferred to employ litho varnishes which are heat-bodied linseed oils, whose viscosity has been increased by heat processing the raw oil. The vehicle in addition to the drying oil usually contains several other ingredients. For example, oleoresinous types of vehicles, commonly known as varnishes, in addition to drying oils contain such materials as resins and driers. The resinous constituents of the vehicle, which provide among others the properties of hardness and resistance to wear, include such materials as coumarone-indene resins, petroleum resins, alkyd resins, phenolic resins, and the like. Examples of driers which can be used are the naphthenate salts of lead, cobalt and manganese. Various pigments are usually contained in the ink in order to give it a desired color. Examples of inorganic pigments include titanium dioxide, zinc oxide, white lead, iron blues, Milori blue, chrome yellows, cadmium yellows and reds, molybdate orange, carbon black, and the like. Organic pigments, such as the azo colors, lithol reds, and the triphenylmethane derivatives, can also be employed. The several components of the printing ink composition are combined in various proportions depending upon the specific properties, e.g., viscosity or color, to be imparted to the ink. Selection of the correct proportions of ingredients to provide a link having desired characteristics can be readily accomplished by one skilled in the art.

The novel compositions of the invention have many applications and are especially useful in the fabrication of molded and extruded articles, such as food containers, bottles, film, rods, pipe, and the like, especially for the fabrication of articles that require various printed matter, such as identifying names, trademarks, trade names, instructions, and the like, be printed, stamped, or otherwise applied to the polymer surface.

A more comprehensive understanding of the invention can be obtained by referring to the following illustrative example which is not intended, however, to be unduly limitative of the invention.

EXAMPLE

Polyethylene pellets (DYNH) (a product of Bakelite Company) were weighed into polyethylene (DYNH) sacks so as to give in each case a total weight of 75 grams of polyethylene. Various amounts of p-toluene sulfonic acid were added to the sacks in amounts such that mixtures containing 0.13 and 0.66 weight percent of the sulfonic acid were obtained. The mixtures of polyethylene pellets and p-toluene sulfonic acid were milled for 10 minutes on a roll mill. The mills had rolls which were three inches in diameter and six inches long, and the temperature of the rolls was maintained at 240° F. The sheets obtained from the milling operation were subsequently molded into plates which were approximately six inches square. Each of the plates was marked off into sections, and each section was imprinted with letters using a rubber stamp which was inked with one of the specimen inks shown in Table I.

*Table I*

IDENTIFICATION OF INKS

| No. | Designation | Color | Manufacturer |
|---|---|---|---|
| 0 | Superior Titan Stamp Pad Ink | Black | Superior Marking Equipment Co., Chicago, Illinois. |
| 1 | MLS; S271 | Orange | Multigraph Sales Agencies, Cleveland, Ohio. |
| 2 | Van Son 42577 | Blue-green | Hilversum, Holland. |
| 3 | Colitho No. 28 | Green | Columbia Ribbon & Carbon Co., Glen Cove, New York. |
| 4 | Colitho No. 5 | Purple | Do. |
| 5 | No. 212-900 | Blue | Sinclair & Valentine Co., Kansas City, Missouri. |

Ink No. 1 contained linseed, oil, varnish, pigments, toners and driers.

Ink No. 3 contained primrose yellow, aluminum hydrate, titanium dioxide, iron blue, and molybdated green toner, which constituted the pigment portion, a drier, and litho varnish. The vehicle portion of this ink had a very low organic acid number.

Ink No. 4 contained aluminum hydrate, iron blue, and alkali blue toner, which was the pigment portion, a drier, litho varnish and oleoresinous varnish. The vehicle portion of this ink also had a very low organic acid number.

The ink on the plates was then allowed to dry after which the plates were subjected to a scrubbing test to measure the wearability of the printed letters. The scrubbing test was carried out with a Gardner Straight Line Washability Machine manufactured by the Gardner Laboratories, Bethesda, Maryland. In this test, a bristle brush was caused to sweep back and forth over the inked plate while the plate was wet with a soap solution. The number of strokes required to remove all of the imprint was recorded. These values, which are herein defined as the relative resistance to scribbing, are recorded below in Table II.

*Table II*

THE EFFECT OF p-TOLUENE SULFONIC ACID UPON THE DURABILITY OF IMPRINTS ON POLYETHYLENE

[Relative resistance to scrubbing]

| Ink No. | 0 | 1 | 2 | 3 | 4 | 5 |
|---|---|---|---|---|---|---|
| Wt. percent p-toluene sulfonic acid: | | | | | | |
| 0 | 7 | 74 | 495 | 175 | 188 | 96 |
| 0.13 | >1,000 | 321 | 1,000 | 276 | 376 | 272 |
| 0.66 | >1,000 | 250 | 554 | 775 | 223 | 116 |

The data in Table II show that concentrations of p-toluene sulfonic acid as low as 0.13 weight percent have a significant effect in providing a polymer surface which is receptive to ink. It is also seen that in some cases the results are improved by increasing the sulfonic acid concentration from 0.13 to 0.66 weight percent. In other cases, while the higher concentrations were not quite as effective as the lower concentrations, there resulted a polymer composition having a surface which was more receptive to ink than the surface of the polymer to which the sulfonic acid had not been added.

From the foregoing, it is apparent that the instant invention provides a method for improving the bonding properties of hydrocarbon polymers which comprises adding to the polymer a sulfur-containing compound as herein described. It will be apparent to those skilled in the art that variations and modifications of the invention can be made. Such variations and modifications are believed to be clearly within the spirit and scope of the invention.

I claim:

1. A composition of matter comprising a solid polymer selected from the group consisting of homopolymers of aliphatic 1-olefins having from 2 to 8, inclusive, carbon atoms per molecule and copolymers of at least two of said 1-olefins, and a sulfur-containing compound corresponding to the following formula:

$$Y(SO_2X)_n$$

wherein Y is at least one radical selected from the group consisting of mono-, di-, and trivalent hydrocarbon radicals, said radicals containing from 4 to 30, inclusive, carbon atoms, wherein X is a member selected from the group consisting of OH, Cl, and $NZ_2$, where Z is a member selected from the group consisting of hydrogen and alkyl, aryl, alkaryl, aralkyl and cycloalkyl radicals, said latter radicals containing from 1 to 7, inclusive, carbon atoms, and wherein $n$ is equal to the valence of Y.

2. The composition according to claim 1 wherein said solid polymer is a polymer of ethylene and said sulfur-containing compound is p-toluenesulfonic acid.

3. The composition according to claim 1 wherein said olid polymer is a polymer of ethylene and said sulfur-containing compound is benzenesulfonic acid.

4. The composition according to claim 1 wherein said solid polymer is a polymer of ethylene and said sulfur-containing compound is 1-naphthalenesulfonic acid.

5. The composition according to claim 1 wherein said solid polymer is a polymer of ethylene and said sulfur-containing compound is diphenyl-3,3′-sulfonic acid.

6. The composition according to claim 1 wherein said solid polymer is a polymer of ethylene and said sulfur-containing compound is 1-butanesulfonic acid.

7. A composition of matter according to claim 2 wherein said solid polymer is a homopolymer of ethylene.

8. A composition of matter according to claim 1 wherein said solid polymer is a homopolymer of propylene.

9. A composition of matter according to claim 1 wherein said solid polymer is a copolymer of ethylene and propylene.

10. A composition of matter according to claim 1 wherein said solid polymer is a copolymer of ethylene and butene-1.

11. A composition of matter comprising a mixture of sulfur-containing compound corresponding to the following formula:

$$Y(SO_2X)_n$$

wherein Y is at least one radical selected from the group consisting of mono-, di-, and trivalent hydrocarbon radicals, said radicals containing from 4 to 30, inclusive, carbon atoms, wherein X is a member selected from the group consisting of OH, Cl, and $NZ_2$, where Z is a member selected from the group consisting of hydrogen and alkyl, aryl, alkaryl, aralkyl and cycloalkyl, radicals, said latter radicals containing from 1 to 7, inclusive, carbon atoms, and wherein n is equal to the valence of Y; and as the sole polymeric component a solid polymer selected from the group consisting of homopolymers of aliphatic 1-olefins having from 2 to 8, inclusive, carbon atoms per molecule and copolymers of at least two of said 1-olefins.

12. A composition of matter comprising p-toluenesulfonic acid and as the sole polymeric component a polymer of ethylene.

13. A composition of matter comprising a solid polymer of ethylene and between 0.01 and 3 weight percent, based on the amount of said polymer, of a sulfur-containing compound corresponding to the following formula:

$$Y(SO_2X)_n$$

wherein Y is at least one radical selected from the group consisting of mono-, di-, and trivalent hydrocarbon radicals, said radicals containing from 4 to 30, inclusive, carbon atoms, wherein X is a member selected from the group consisting of OH, Cl, and $NZ_2$, where Z is a member selected from the group consisting of hydrogen and alkyl, aryl, alkaryl, aralkyl and cycloalkyl radicals, said latter radicals containing from 1 to 7, inclusive, carbon atoms, and wherein n is equal to the valence of Y.

14. A composition of matter consisting essentially of a polymer of ethylene and between 0.01 and 3 weight percent of p-toluenesulfonic acid.

15. A method for printing on the surface of a solid polymer selected from the group consisting of homopolymers of aliphatic 1-olefins having from 2 to 8, inclusive, carbon atoms per molecule and copolymers of at least two of said 1-olefins which comprises mixing with said polymer a sulfur-containing compound corresponding to the following formula:

$$Y(SO_2X)_n$$

wherein Y is at least one radical selected from the group consisting of mono-, di-, and trivalent hydrocarbon radicals, said radicals containing from 4 to 30, inclusive, carbon atoms, wherein X is a member selected from the group consisting of OH, Cl, and $NZ_2$, where Z is a member selected from the group consisting of hydrogen and alkyl, aryl, alkaryl, aralkyl and cycloalkyl radicals, said latter radicals containing from 1 to 7, inclusive, carbon atoms, and wherein n is equal to the valence of Y; forming the resulting composition into an article having at least one surface and applying an ink to at least a portion of a selected surface of said article.

16. A method in accordance with claim 15 wherein the amount of said sulfur-containing compound is in the range of about 0.01 to about 3 weight percent based on the amount of said polymer.

17. A method in accordance with claim 15 wherein said polymer is polyethylene and said sulfur-containing compound is p-toluenesulfonic acid.

18. A method in accordance with claim 15 wherein said polymer is a copolymer of ethylene and butene-1.

References Cited in the file of this patent

UNITED STATES PATENTS

| | | |
|---|---|---|
| 2,632,921 | Kreidl | Mar. 31, 1953 |
| 2,639,998 | Pavlic | May 26, 1953 |
| 2,773,856 | Meyer et al. | Dec. 11, 1956 |
| 2,776,946 | Lytton et al. | Jan. 8, 1957 |
| 3,043,825 | Frese et al. | July 10, 1962 |

UNITED STATES PATENT OFFICE
CERTIFICATE OF CORRECTION

Patent No. 3,160,514 December 8, 1964

Charles E. Wheelock

It is hereby certified that error appears in the above numbered patent requiring correction and that the said Letters Patent should read as corrected below.

Column 7, line 12, for the claim reference numeral "2" read -- 1 --.

Signed and sealed this 24th day of August 1965.

(SEAL)
Attest:

ERNEST W. SWIDER
Attesting Officer

EDWARD J. BRENNER
Commissioner of Patents